3,426,725
SONAR SYSTEMS IN VESSELS
Torvald S. Gerhardsen, Horten, Norway, assignor to
Simonsen & Mustad A.S., Horten, Norway
Filed July 7, 1967, Ser. No. 651,774
U.S. Cl. 116—27                                6 Claims
Int. Cl. B63b 45/04

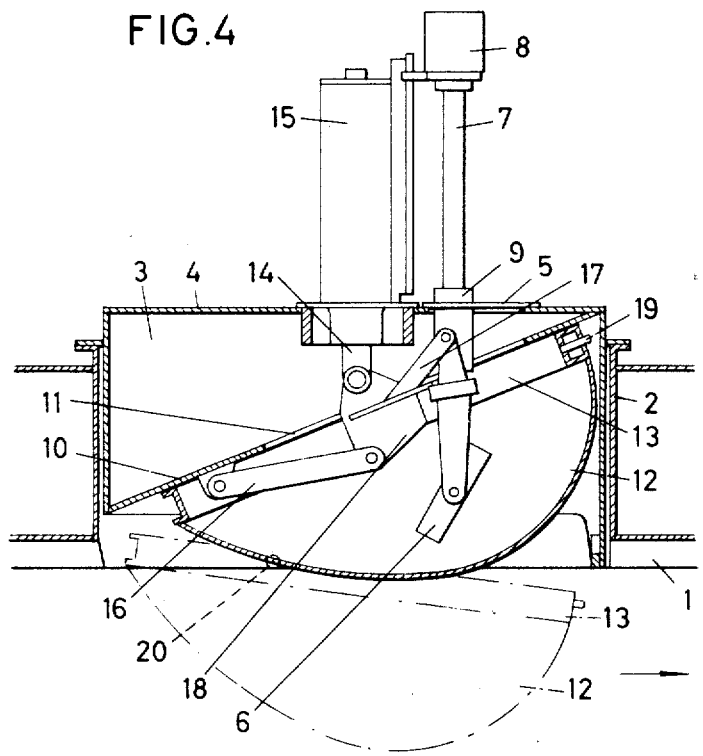

ABSTRACT OF THE DISCLOSURE

A sonar system for fishing vessels in which a transducer is mounted for rectilinear movement into and out of a protective well in the vessel bottom, the transducer being surrounded by a streamlined liquid filled cup of sound permeable material which is constructed in such a way, and so connected to an inclined, apertured partition within the protective well, that the upper edge of the cup may be drawn into a sealing relation with said partition as the transducer is moved upwardly into the well, whereby the transducer may be accessible from the interior of the vessel. The cup may be locked in its lower position.

---

The present invention relates to a sonar system for use in fishing vessels. For the performance of such a system, i.e. the emission and reception of sound waves through water, an antenna or transducer has to be provided immersed in the water, preferably underneath the bottom of the vessel.

The arrangement and the structure of that part of the system which is to be submerged in the water are primarily dictated by the fact that it is a condition for the efficiency of the same that the water flow around the transducer is, so far as possible undisturbed by whirl formations, air bubbles and cavitation phenomena. Such a condition is not easily accomplished under all circumstances, as the transducer must be turnable into all directions in a horizontal plane, independently of the direction of advance of the vessel. Up to the present time, it has been conventional to arrange the transducer in a generally stream lined, egg shaped liquid filled container, made of a material permeable to sound waves. By such an arrangement, a laminar water flow is obtained along the outside of the container, and the transducer has been turnable in all directions, both horizontally and vertically, in the stationary liquid inside of the container. Even if such an arrangement has been so made that the entire container may be hoisted into the vessel, it nevertheless possesses the essential inconvenience that, when in operation, fishing tackle, ropes and the like in the sea easily may be caught by the container, thereby involving danger of destruction of both tackle and sonar system. Even if systems of this type have been hoistable into the vessel, it has generally been necessary to slip the vessel for repair and maintenance, as the well into which the container is hoisted, necessarily must be open to the sea.

The object of the present invention is a sonar system wherein the inconveniences mentioned above are avoided, in that the system comprises a stream lined cup shaped member which, by means of a hinge joint, is pivotably mounted relatively to the edges of a protection well in the bottom of the vessel. Thus, the transducer is mounted, in the conventional manner, inside of a liquid filled container which is permeable to sound waves, but as compared with the previously known systems, the system according to the invention presents the advantages that not only will the stream lined cup member permit tackle, ropes or the like, which might be encountered, to slide off underneath the cup without being caught, but in addition, the hinge joint will, when required, permit the swinging of the cup out of and into a comparatively small protection well in the bottom of the vessel.

In order to permit maintenance and repair of the equipment in the interior of the container, one free edge of the cup member may, according to a further feature of the invention, be secured to a rigid frame which, in the in-swung position of the cup member, is in sealing engagement with a corresponding flange in the protection well, to the effect that the cup member forms a wall against the sea, and the transducer may be taken into the vessel without any necessity for slipping.

Conveniently, the hinge joint between the cup member and the protection well is so formed that one end of the hinge is connected to the frame along the cup edge, while the other end connects with the flange in the well, so that the hinge joint is accessible when the cup member is in the in-swung position. In order to restrict as much as possible the dimensions of the protective well, and thereby reduce the detrimental effect on the bottom of the vessel and to the liquid flow along the same, the hinge joint conveniently may be formed as a lever system, to the effect that the movement of the cup member is a combined lifting and swinging movement. Further, in order to take the stream line formation into consideration, it is convenient to arrange the well flange at an angle to the horizontal-plane. Both features result in that the well may be made of such restricted dimensions that the cup member, when in raised position, approximately fills that portion of the well which is situated beneath the oblique flange.

One embodiment of the sonar system of the invention is now to be described more in detail, with reference to the accompanying drawings, in which FIGURE 1 is a vertical fore-and-aft sectional view of the system, with the cup member in its lowered position.

FIGURE 3 is a horizontal sectional view, taken along the line III—III of FIGURE 1.

FIGURE 4 is a fore-and-aft sectional view, corresponding to that of FIGURE 1, with the cup member in its raised position.

Figure 1:
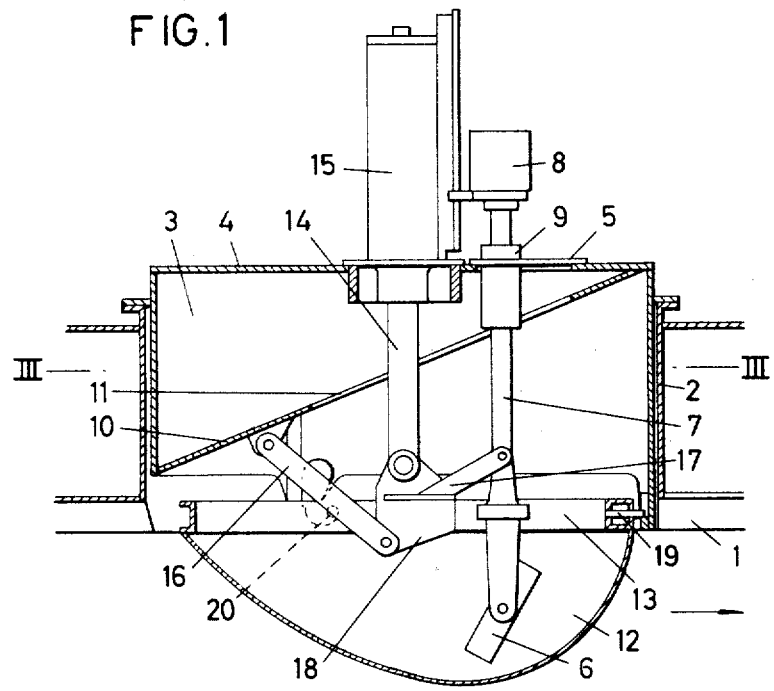

In the drawings, 1 is the bottom of a vessel, incorporating a well 2 which is closed towards the interior of the vessel by a casing 3 which is closed upwardly and secured water tight to the edge of the well 2, but which is open downwardly towards the sea. The top 4 of the casing 3 supports, through a cover 5, the sonar system proper comprising a transducer 6, a vertical supporting column 7 and means 8 for the turning and swinging of the transducer 6 both in the vertical and the horizontal planes. The column 7 is slidably mounted in a guide 9 permitting the vertical movements of the transducer. In the casing 3, there is provided an obliquely positioned flange 10 which defines an opening 11 and in the free, lower opening of the casing, there is arranged a streamlined cup member 12, made of a material which is permeable to sound waves. The cup 12 is filled with sea water, due to the fact that the edge of the same is in open connection with the sea. Along the free, top edge the cup 12 is provided with a frame structure 13 of the same contour shape as that of the flange 10 in the casing 3.

To the frame 13 of the cup member, there is hingedly connected a rod 14 which cooperates with raising means 15, such as a hydraulic jack, which is permanently mounted on the top wall 4 of the casing 3, for the lifting of the cup member 12 from the position shown in FIG. 1 to the position shown in FIG. 4.

On the flange 10 and the frame 13, there is mounted a hinge joint which comprises levers 16, to the effect that the cup member 12, when actuated by the rod 14, will perform a combined swinging and lifting movement, and in fully raised position of the cup member, the frame 13 will be in sealing engagement with the flange 10 of the casing 3. For the purpose of guiding the transducer column 7 during the movements of the cup member 12, levers 17 are at one end pivotably connected to the column 7 and at the opposite end rigidly secured to means 18 on the cup frame 13 in which the rod 14 and the levers 16 are supported, to the effect that the column 7 always maintains its vertical position. At the foremost edge of the cup frame 13, there is provided lock means 19 for the purpose of locking the cup member in the lowermost position, as also the swinging movement of the levers 16 is checked in the downward direction by means 20.

For the purpose of obtaining a stable support of the cup member, it may be convenient to arrange that it is continuously pressed against the supporting points 19 and 20, for instance by maintaining the raising means 15 under pressure. There may also be provided an automatic supervision device, which ensures pressure supply to the device 15 if the pressure therein should fall below a certain value. Such supervision device may also be so arranged as to reduce the pressure in the device 15, to the effect that the cup member 12 may yield somewhat, in order to reduce the effects of blows against the cup, if the vessel is operating in a heavy sea.

The locking means 19 and 20 may also be so arranged as to be adjustable, for the purpose of permitting a lowering of the cup member beyond the supported position, in order to make the space above the cup accessible also from the outside.

Figure 2:
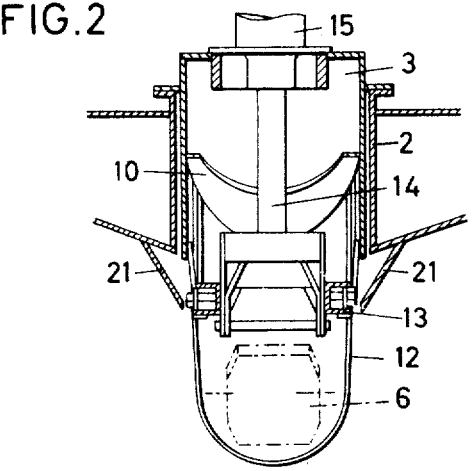
FIGURE 2 is a corresponding athwartship sectional view.

If the vessel is provided with a bar keel, or if the vessel bottom tapers towards the keel, a flow sheath 21 may be provided around the lower edge of the well 2, as shown in FIGURE 2.

I claim:

1. A sonar system for use aboard a vessel comprising, a transducer, a protection well extending inwardly from the bottom of said vessel and opening to the outside thereof, hoisting means mounting on said well, said hoisting means and said transducer being operatively associated for vertical, rectilinear movement of said transducer into or out of said protection well, a streamlined cup-shaped member surrounding said transducer and adapted for hinged movement into or out of said well, linkage means operatively associated with said cup member, said transducer and said hoist means for simultaneously moving said transducer and said cup member into or out of said well.

2. A system as claimed in claim 1, characterized by a rigid frame structure provided at the free edge of the cup member, and a corresponding flange structure in the protection well, the said frame and the said flange being adapted for sealing engagement.

3. A system as claimed in claim 1, characterized in that the hinge joint means between the cup member and the protection well is so arranged that one end of the same is connected to the frame along the cup edge, while the other end is connected to the flange in the protection well.

4. A sytsem as claimed in claim 3, characterized in that the hinge joint means is formed as a lever system.

5. A system as claimed in claim 1 characterized in that the flange in the protection well is obliquely positioned.

6. A system as claimed in claim 1, characterized in that the cup member and the protection well are provided with cooperating means locking the cup member in its lowermost position.

References Cited

UNITED STATES PATENTS

| | | | |
|---|---|---|---|
| 2,398,815 | 4/1946 | Turner | 181—.5 |
| 2,400,870 | 5/1946 | Bates | 116—27 |
| 2,407,240 | 9/1946 | Barber | 116—27 |
| 2,813,591 | 11/1957 | Smaltz et al. | 116—27 |
| 2,865,318 | 12/1958 | Clynes et al. | 114—.5 |

LOUIS J. CAPOZI, *Primary Examiner.*

U.S. Cl. X.R.

340—15; 114—.5